(12) United States Patent
Liu et al.

(10) Patent No.: US 11,262,878 B1
(45) Date of Patent: Mar. 1, 2022

(54) TOUCH MODULE

(71) Applicant: TPK Advanced Solutions Inc., Fujian (CN)

(72) Inventors: Qi Bin Liu, Xiamen (CN); Kuo Lung Fang, Hsinchu (TW); Ya Mei Chen, Xiamen (CN); Ya Ting Hsu, Lunbel Township, Yunlin County (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/124,888

(22) Filed: Dec. 17, 2020

(30) Foreign Application Priority Data

Sep. 30, 2020 (CN) .......................... 202011062617.8

(51) Int. Cl.
*G06F 3/044* (2006.01)
(52) U.S. Cl.
CPC .................................. *G06F 3/0443* (2019.05)
(58) Field of Classification Search
None
See application file for complete search history.

(56) References Cited

U.S. PATENT DOCUMENTS 10,817,119 B2 * 10/2020 Tsai ..................... G06F 3/04164
2017/0277314 A1 * 9/2017 Chen ..................... G06F 3/0412

FOREIGN PATENT DOCUMENTS

| TW | 201604729 A | 2/2016 |
| TW | 201610773 A | 3/2016 |
| TW | 201626190 A | 7/2016 |
| TW | 201910992 A | 3/2019 |

* cited by examiner

*Primary Examiner* — Duane N Taylor, Jr.
(74) *Attorney, Agent, or Firm* — Cooper Legal Group, LLC

(57) ABSTRACT

The present disclosure relates to the field of touch technology, and provides a touch module, which includes a substrate, a first touch sensing layer, a metal wiring layer, and a transparent conductive layer. The substrate has a visible area and a peripheral area located around the visible area. The first touch sensing layer extends from the visible area to the peripheral area of the substrate. The metal wiring layer is located in the peripheral area of the substrate and is laterally separated from the first touch sensing layer. The transparent conductive layer is located in the peripheral area of the substrate and has a first portion and a second portion. The first portion is in contact with the first touch sensing layer and the second portion is in contact with the metal wiring layer.

20 Claims, 6 Drawing Sheets

TOUCH MODULE

CROSS-REFERENCE TO RELATED APPLICATION

This application claims priority to China Application Serial Number 202011062617.8, filed on Sep. 30, 2020, which is herein incorporated by reference in its entirety.

BACKGROUND

Field of Disclosure

The present disclosure relates to the field of touch technology, and in particular, to a touch module with low lap-joint impedance.

Description of Related Art

In recent years, as the touch technology has developed, transparent conductors have often been applied in many display or touch-related devices since transparent conductors can allow light to pass through while providing proper conductivity. In general, the transparent conductors may be various metal oxides, such as indium tin oxide (ITO), indium zinc oxide (IZO), cadmium tin oxide (CTO), or aluminum-doped zinc oxide (AZO). However, films made of these metal oxides cannot meet the requirements for flexibility of display devices. Therefore, a variety of flexible transparent conductors, such as a transparent conductor made of a material such as a metal nanowire, have been developed nowadays.

However, there are still many problems to be solved for display or touch devices made of the metal nanowires. For example, when metal nanowires are used to make a touch electrode, the touch electrode often directly extends to the peripheral area for an electrical bond with the metal wiring. However, as the metal nanowires are distributed in the touch electrode in a filamentous pattern, the contact area between the metal nanowires and the metal wiring is small, which cannot effectively reduce (i.e., sufficiently minimize) the lap-joint impedance between the touch electrode and the metal wiring. Further, as electrochemical reaction (for example, the ionic oxidation-reduction reaction) often occurs spontaneously between metal nanowires and metal wiring, the metal wiring is easily oxidized, resulting in an increase in the lap-joint impedance between the touch electrode and the metal wiring. As a result, a larger bonding area is required to reduce the lap-joint impedance between the touch electrode and the metal wiring, which is not conducive to meeting the requirement for a narrow bezel of the touch module and easily leads to insufficient reliability of products.

SUMMARY

In order to overcome the problem of high lap-joint impedance between a touch electrode and metal wiring, the present disclosure provides a display module having a transparent conductive layer located in a peripheral area. The transparent conductive layer can be electrically connected to a touch sensing layer located in a visible area and a metal wiring layer located in the peripheral area in order to implement the electrical bonding between the touch sensing layer and the metal wiring layer. This can avoid directly using the touch sensing layer including metal nanowires for the bond, thereby achieving the effect of reducing lap-joint impedance to improve the reliability of products and meet the requirement for a narrow bezel of a touch module.

According to some embodiments of the present disclosure, the touch module includes a substrate, a first touch sensing layer, a metal wiring layer and a transparent conductive layer. The substrate has a visible area and a peripheral area located around the visible area. The first touch sensing layer extends from the visible area to the peripheral area of the substrate. The metal wiring layer is located in the peripheral area of the substrate and is laterally separated from the first touch sensing layer. The transparent conductive layer is located in the peripheral area of the substrate and has a first portion and a second portion. The first portion is in contact with the first touch sensing layer and the second portion is in contact with the metal wiring layer.

In some embodiments, the first portion of the transparent conductive layer is located between the substrate and the first touch sensing layer, and the second portion of the transparent conductive layer is located between the substrate and the metal wiring layer.

In some embodiments, the transparent conductive layer further extends to the visible area of the substrate.

In some embodiments, the metal wiring layer and the first touch sensing layer are separated by a lateral distance between 5 μm and 15 μm.

In some embodiments, the touch module may further include at least one insulating layer covering an upper surface of the metal wiring layer and extending between the first touch sensing layer and the metal wiring layer.

In some embodiments, a width of the insulating layer is between 10 μm and 20 μm.

In some embodiments, the insulating layer further extends to cover an outer sidewall of the metal wiring layer.

In some embodiments, the transparent conductive layer further has a third portion located between the first portion and the second portion, and the third portion is in contact with the insulating layer.

In some embodiments, an outer sidewall of the first touch sensing layer is aligned with an inner sidewall of the insulating layer.

In some embodiments, the first touch sensing layer further extends to cover an upper surface of the insulating layer.

In some embodiments, an outer sidewall of the first touch sensing layer is aligned with an outer sidewall of the insulating layer.

In some embodiments, the touch module further includes a second touch sensing layer located in the visible area of the substrate and between the substrate and the first touch sensing layer, wherein a material of the second touch sensing layer is identical to a material of the transparent conductive layer.

In some embodiments, the transparent conductive layer includes indium tin oxide, indium zinc oxide, cadmium tin oxide, aluminum-doped zinc oxide, or combinations thereof.

In some embodiments, the first touch sensing layer includes a matrix and a plurality of metal nanostructures distributed in the matrix.

In some embodiments, the touch module further includes a light shielding layer located between the substrate and the transparent conductive layer.

In some embodiments, the touch module may further include a water vapor barrier layer laterally extending on the first touch sensing layer, the metal wiring layer, and the transparent conductive layer, wherein the water vapor barrier layer includes an inorganic material.

In some embodiments, the inorganic material includes a silicon-nitrogen compound, a silicon-oxygen compound, or combinations thereof.

In some embodiments, the water vapor barrier layer extends to cover an outer sidewall of the first touch sensing layer and an outer sidewall of the metal wiring layer.

In some embodiments, the touch module may further include at least one coating layer located between the water vapor barrier layer and the first touch sensing layer.

In some embodiments, the water vapor barrier layer further extends to cover an outer sidewall of the coating layer.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1A:
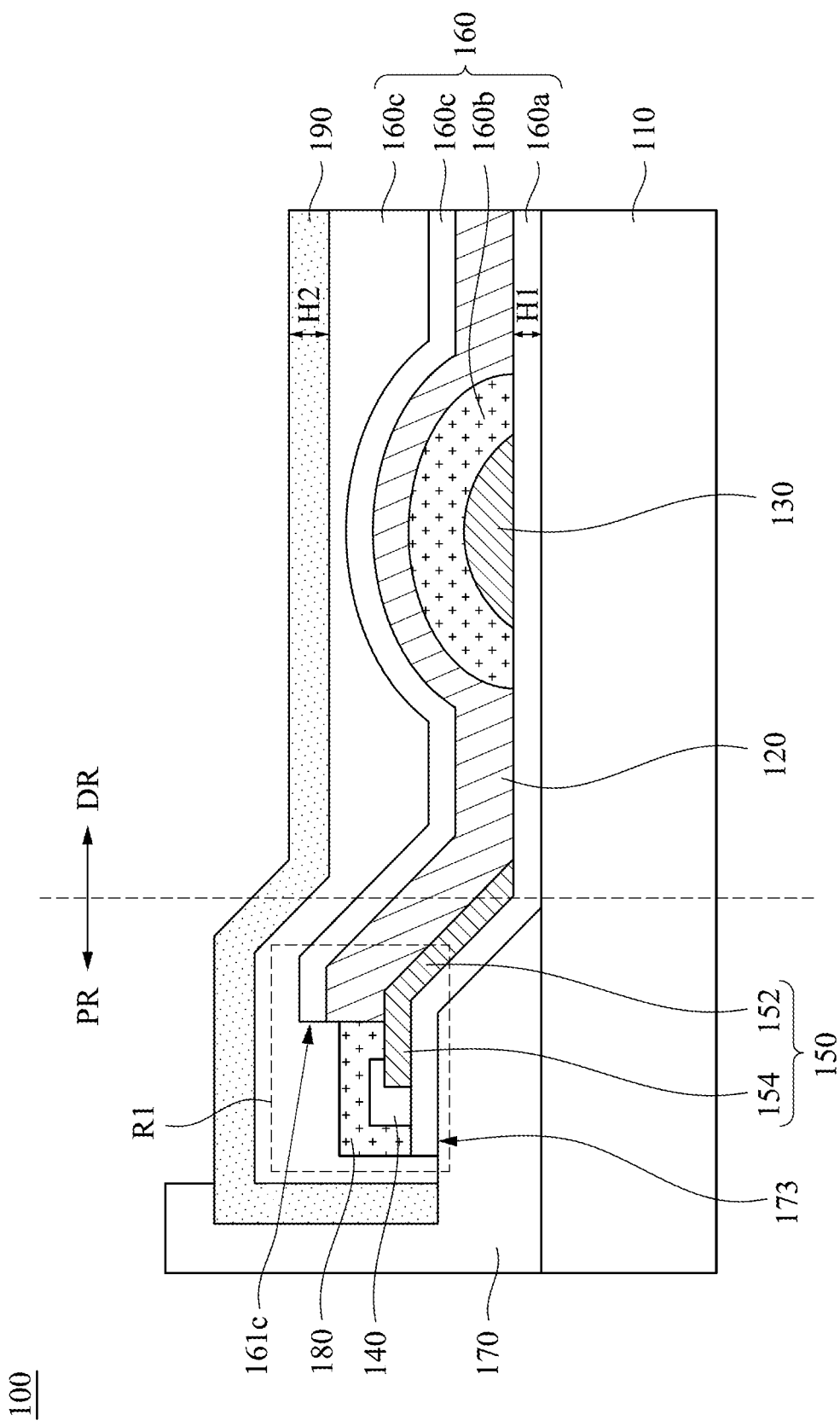
FIG. 1A is a schematic side view of a touch module according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

In addition, relative terms such as "lower" or "bottom" and "upper" or "top" can be used herein to describe the relationship between one element and another element, as shown in the figures. It should be understood that relative terms are intended to include different orientations of the device other than those shown in the figures. For example, if the device in one figure is turned over, elements described as being on the "lower" side of other elements will be oriented on the "upper" side of the other elements. Therefore, the exemplary term "lower" may include an orientation of "lower" and "upper", depending on the specific orientation of the drawing. Similarly, if the device in one figure is turned over, elements described as "below" other elements will be oriented "above" the other elements. Therefore, the exemplary term "below" can include an orientation of "above" and "below".

Referring to FIG. 1A, a schematic side view of a touch module 100 according to some embodiments of the present disclosure is illustrated. The touch module 100 of the present disclosure includes a substrate 110, a first touch sensing layer 120, a second touch sensing layer 130, a metal wiring layer 140, and a transparent conductive layer 150. In some embodiments, the substrate 110 has a visible area DR and a peripheral area PR located around the visible area DR. The first touch sensing layer 120 is disposed on the substrate 110 and extends from the visible area DR to the peripheral area PR of the substrate 110. The second touch sensing layer 130 is disposed between the substrate 110 and the first touch sensing layer 120 and is located in the visible area DR of the substrate 110. The metal wiring layer 140 is disposed on the substrate 110, located in the peripheral area PR of the substrate 110, and laterally separated from the first touch sensing layer 120 (i.e., separated from each other in a horizontal direction; for additional details, please refer to FIG. 1B). The transparent conductive layer 150 is disposed on the substrate 110, located in the peripheral area PR of the substrate 110, and connected to the first touch sensing layer 120 located in the visible area DR and the metal wiring layer 140 located in the peripheral area PR, in order to implement the electrical bonding between the first touch sensing layer 120 and the metal wiring layer 140. More specifically, the transparent conductive layer 150 has a first portion 152 and a second portion 154, wherein the first portion 152 is in contact with the first touch sensing layer 120, and the second portion 154 is in contact with the metal wiring layer 140. In some embodiments, the touch module 100 may further include a display panel (not shown) to sandwich the foregoing layers together with the substrate 110, such that the touch module 100 can further serve as a touch display module. In some embodiments, the touch module 100 may further include a light shielding layer 170 disposed in the peripheral area PR of the substrate 110 and configured to shield light (e.g., visible light having a wavelength between 400 nm and 700 nm), and the light shielding layer 170 can be made of dark photoresist (e.g., ink) or other opaque metal materials. In some embodiments, the touch module 100 further includes a plurality of coating layers 160. The coating layers 160 can, for example, laterally extend on the substrate 110 and be disposed between the substrate 110 and the second touch sensing layer 130, between the second touch sensing layer 130 and the first touch sensing layer 120, and on the first touch sensing layer 120 to cover the first touch sensing layer 120, but the present disclosure is not limited in this regard. In the present disclosure, the transparent conductive layer 150 is disposed to achieve the effect of reducing the lap-joint impedance in order to improve the reliability of products and meet the requirement for a narrow bezel of the touch module 100, which will be discussed in more detail in the following descriptions.

In some embodiments, the second touch sensing layer 130 can be disposed in a first axial direction (e.g., x axis) to transmit a touch sensing signal of the touch module 100 in the first axial direction to the peripheral area PR for subsequent processing. In other words, the second touch sensing layer 130 can serve as a horizontal touch sensing electrode. In some embodiments, the second touch sensing layer 130 may be, for example, an indium tin oxide conductive layer. In other embodiments, the second touch sensing layer 130 may be, for example, an indium zinc oxide, cadmium tin oxide, or zinc aluminum oxide conductive layer. Since the foregoing materials have excellent light transmittance, when the touch module 100 is configured to serve as a touch display module, the foregoing materials will not affect the optical properties (e.g., optical transmittance and clarity) of the touch module 100.

In some embodiments, the first touch sensing layer 120 can be disposed in a second axial direction (e.g., y axis) to transmit a touch sensing signal of the touch module 100 in the second axial direction to the peripheral area PR for subsequent processing. In other words, the first touch sensing layer 120 can serve as a vertical touch sensing electrode.

In some embodiments, the first touch sensing layer 120 may include a matrix and a plurality of metal nanowires (also called metal nanostructures) distributed in the matrix. The matrix may include polymers or a mixture thereof to impart specific chemical, mechanical, and optical properties to the first touch sensing layer 120. For example, the matrix can provide good adhesion between the first touch sensing layer 120 and other layers. As another example, the matrix can also provide good mechanical strength for the first touch sensing layer 120. In some embodiments, the matrix may include a specific polymer, such that the first touch sensing layer 120 has additional scratch-resistant and wear-resistant surface protection, thereby improving the surface strength of the first touch sensing layer 120. The foregoing specific polymer may be, for example, polyacrylate, epoxy resin, polyurethane, polysiloxane, polysilane, poly(silicon-acrylic acid), or combinations thereof. In some embodiments, the matrix may further include a surfactant, a cross-linking agent, a stabilizer (including but not limited to, for example, an antioxidant or an ultraviolet stabilizer), a polymerization inhibitor, or combinations of any of the foregoing ingredients, in order to improve the ultraviolet resistance of the first touch sensing layer 120 and prolong its service life.

In some embodiments, the metal nanowires may include, but are not limited to, silver nanowires, gold nanowires, copper nanowires, nickel nanowires, or a combination thereof. More specifically, the term "metal nanowire" herein is a collective noun, which refers to a collection of metal wires of a plurality of metal elements, metal alloys, or metal compounds (including metal oxides). In addition, the number of metal nanowires included in the first touch sensing layer 120 is not intended to limit the present disclosure. Since the metal nanowires of the present disclosure have excellent light transmittance, when the touch module 100 is configured to serve as a touch display module, the metal nanowires can provide good conductivity for the first touch sensing layer 120 without affecting the optical properties of the touch module 100.

In some embodiments, a cross-sectional size (e.g., a diameter of the cross section) of a single metal nanowire can be less than 500 nm, preferably less than 100 nm, and more preferably less than 50 nm, such that the first touch sensing layer 120 have a low haze. In detail, when the cross-sectional size of the single metal nanowire is greater than 500 nm, the single metal nanowire is excessively thick, resulting in an excessively high haze of the first touch sensing layer 120, thus affecting the visual clarity of the visible area DR of the touch module 100. In some embodiments, an aspect ratio (length to diameter) of the metal nanowire may be between 10 and 100,000, such that the first touch sensing layer 120 can have a lower electrical resistivity, a higher light transmittance, and a lower haze. In detail, when the aspect ratio of a single metal nanowire is less than 10, a conductive network may not be well formed, resulting in an excessively high resistivity of the first touch sensing layer 120. Therefore, the metal nanowires must be distributed in the matrix with a greater arrangement density (i.e., the number of metal nanowires included in the first touch sensing layer 120 per unit volume) in order to improve the conductivity of the first touch sensing layer 120, such that the first touch sensing layer 120 can have an excessively low light transmittance and an excessively high haze. It is noted that other terms such as silk, fiber, or tube also have the aforementioned cross-sectional dimensions and aspect ratios, which also fall within the scope of the present disclosure.

In some embodiments, the transparent conductive layer 150 is located at least in the peripheral area PR of the substrate 110, wherein the substrate 110 and the first touch sensing layer 120 sandwich the first portion 152 of the transparent conductive layer 150, and the substrate 110 and the metal wiring layer 140 sandwich the second portion 154 of the transparent conductive layer 150. The transparent conductive layer 150 is used to connect the metal wiring layer 140 and the first touch sensing layer 120, which are separated from each other in the horizontal direction, such that the electrical bonding between the metal wiring layer 140 and the first touch sensing layer 120 can be implemented. Specifically, a sensing signal of the first touch sensing layer 120 can be transmitted to the metal wiring layer 140 through the transparent conductive layer 150, and the metal wiring layer 140 can be further connected to an external circuit element through a flexible circuit board (not shown), thereby transmitting the sensing signal of the first touch sensing layer 120 to an external integrated circuit for subsequent processing. A lateral extending area of the first touch sensing layer 120 is generally larger than a lateral extending area of the metal wiring layer 140. Therefore, in some embodiments, a contact area between the first portion 152 of the transparent conductive layer 150 and the first touch sensing layer 120 can be set to be greater than a contact area between the second portion 154 of the transparent conductive layer 150 and the metal wiring layer 140 in order to improve the bonding stability between the transparent conductive layer 150 and the first touch sensing layer 120 and preferably reduce the width of a bezel of the touch module 100.

In some embodiments, a material of the transparent conductive layer 150 may be a transparent conductive material including indium tin oxide, indium zinc oxide, cadmium tin oxide, aluminum-doped zinc oxide, or combinations thereof. In some embodiments, the material of the transparent conductive layer 150 may be substantially identical to a material of the second touch sensing layer 130. In some embodiments, the transparent conductive layer 150 and the second touch sensing layer 130 can be further fabricated in a same process. For example, a dispersion or slurry including the foregoing transparent conductive material can be formed on the substrate 110 by coating, and cured/dried, such that the transparent conductive material is entirely formed above the substrate 110. Then, the transparent conductive material formed on the substrate 110 is patterned, such that the transparent conductive material is defined as a pattern in order to fabricate a second touch sensing layer 130 with a pattern in the visible area DR and fabricate a transparent conductive layer 150 with a pattern in the peripheral area PR. In other words, the transparent conductive layer 150 and the second touch sensing layer 130 of the present disclosure can substantially belong to a same layer (i.e., can be portions of a single layer). In this way, the transparent conductive layer 150 can be fabricated together with the second touch sensing layer 130 in order to reduce manufacturing processes and costs. Further, because the material of the transparent conductive layer 150 has an excellent light transmittance, in some embodiments, the transparent conductive layer 150 can further extend to the visible area DR (as shown in FIG. 1A) of the substrate 110 to increase its contact area with the first touch sensing layer 120. This improves the bonding stability between the transparent conductive layer 150 and the first touch sensing layer 120 without affecting optical properties (e.g., the optical transmittance and clarity) of the visible area DR.

In the present disclosure, the transparent conductive layer 150 is used to implement the electrical bonding between the first touch sensing layer 120 and the metal wiring layer 140, and the transparent conductive layer 150 is made of metal oxide materials with lower reactivity such as indium tin oxide, indium zinc oxide, cadmium tin oxide, aluminum-doped zinc oxide, or combinations thereof. Therefore, when the transparent conductive layer 150 and the metal wiring layer 140 are electrically bonded, the metal oxide materials in the transparent conductive layer 150 do not undergo any spontaneous electrochemical reaction (e.g., an ionic oxidation-reduction reaction) with metals (e.g., copper, aluminum, copper alloy, aluminum alloy, or combinations thereof) in the metal wiring layer 140. This prevents surface oxidation of the metal wiring layer 140 in order to improve the bonding stability between the transparent conductive layer 150 and the metal wiring layer 140.

Similarly, the metal oxide materials in the transparent conductive layer 150 do not undergo any spontaneous electrochemical reaction with metal nanowires in the first touch sensing layer 120, and therefore the bonding stability between the transparent conductive layer 150 and the first touch sensing layer 120 is improved. Further, since the metal oxide materials are closely stacked in the transparent conductive layer 150 (rather than being distributed in a filamentous manner in the first touch sensing layer 120 like metal nanowires), when the transparent conductive layer 150 and the metal wiring layer 140 are electrically bonded, the opportunity for contact between the metal oxide materials in the transparent conductive layer 150 and the metals in the metal wiring layer 140 can be improved. This reduces the lap-joint impedance between the transparent conductive layer 150 and the metal wiring layer 140 to improve the bonding stability. According to the above, since the transparent conductive layer 150 can have good bonding stability with the first touch sensing layer 120, the bonding area between the transparent conductive layer 150 and the first touch sensing layer 120 needs not be excessively large, thus meeting the requirement for a narrow bezel of the touch module 100 and improving the reliability of products.

Figure 1B:
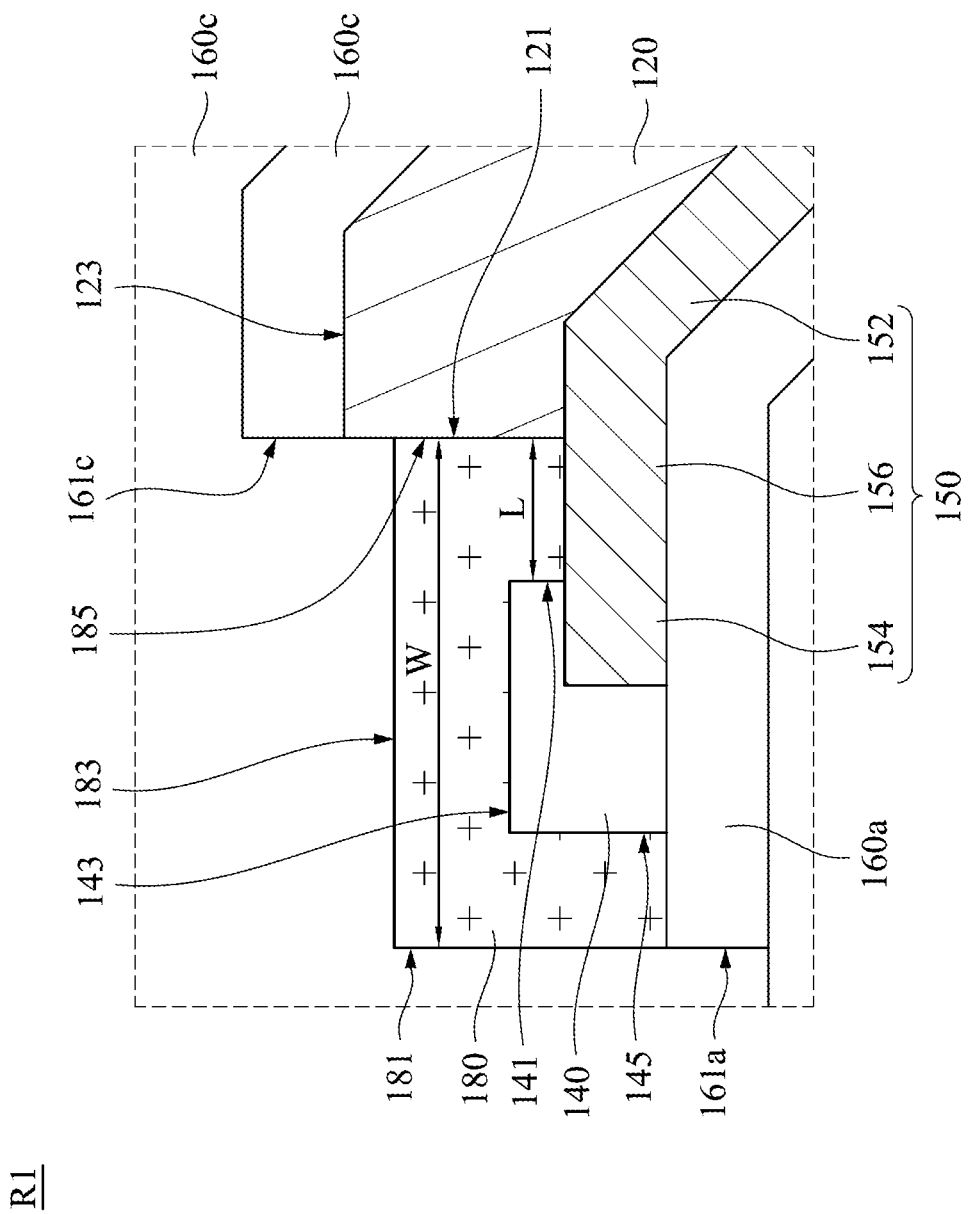
FIG. 1B is a partially enlarged schematic diagram of an area R1 of the touch module according to some embodiments of the present disclosure.

FIG. 1B is a partially enlarged schematic diagram of an area R1 of a touch module 100 according to some embodiments of the present disclosure. Please refer to FIG. 1A and FIG. 1B at the same time. In some embodiments, the metal wiring layer 140 and the first touch sensing layer 120 are separated by a lateral distance L (i.e., a horizontal distance between an inner sidewall 141 of the metal wiring layer 140 and an outer sidewall 121 of the first touch sensing layer 120) of 5 μm to 15 μm. In this way, it can be ensured that the metal wiring layer 140 and the first touch sensing layer 120 are not in contact with each other, and the requirement for a narrow bezel of the touch module 100 can be well met. In detail, when the lateral distance L is less than 5 μm, accidental contact between the metal wiring layer 140 and the first touch sensing layer 120 may occur due to a close distance between the metal wiring layer 140 and the first touch sensing layer 120, such that metals in the metal wiring layer 140 and metal nanowires in the first touch sensing layer 120 undergo the spontaneous electrochemical reaction, and the lap-joint impedance of the touch module 100 cannot decrease (e.g., the lap-joint impedance cannot achieve a specified value). When the lateral distance L is greater than 15 μm, an excessively larger width of the peripheral area PR of the touch module 100 may result, such that the touch module 100 cannot meet the requirement for a narrow bezel.

In some embodiments, the touch module 100 further includes at least one insulating layer 180 covering an upper surface 143 (a surface of the metal wiring layer 140 facing away from the substrate 110) of the metal wiring layer 140 and extending between the first touch sensing layer 120 and the metal wiring layer 140 in order to further ensure that the first touch sensing layer 120 and the metal wiring layer 140 are separated from each other. In some embodiments, the insulating layer 180 has a portion extending between the first touch sensing layer 120 and the metal wiring layer 140. The width W of the insulating layer 180 is between 10 μm and 20 μm. This ensures that the metal wiring layer 140 and the first touch sensing layer 120 are not in contact with each other, and the requirement for a narrow bezel of the touch module 100 can be well met. In detail, when the width W is less than 10 μm, the metal wiring layer 140 and/or the first touch sensing layer 120 may accidentally penetrate through the insulating layer 180, such that metals in the metal wiring layer 140 and metal nanowires in the first touch sensing layer 120 are in contact with each other to undergo the electrochemical reaction, and the lap-joint impedance of the touch module 100 cannot decrease (e.g., the lap-joint impedance cannot achieve a specified value). When the width W is greater than 20 μm, an excessively larger width of the peripheral area PR of the touch module 100 may result, such that the touch module 100 cannot meet the requirement for a narrow bezel. In some embodiments, the insulating layer 180 can completely fill a gap between the first touch sensing layer 120 and the metal wiring layer 140. That is, the width W of the insulating layer 180 can be substantially equal to the lateral distance L between the metal wiring layer 140 and the first touch sensing layer 120.

In some embodiments, the insulating layer 180 can further be in contact with the transparent conductive layer 150. Specifically, the transparent conductive layer 150 has a third portion 156 located between the first portion 152 and the second portion 154 and connected to the first portion 152 and the second portion 154, and the insulating layer 180 is in contact with the third portion 156 of the transparent conductive layer 150. In some embodiments, the insulating layer 180 entirely covers an upper surface of the third portion 156 of the transparent conductive layer 150. That is, the third portion 156 of the transparent conductive layer 150 is completely covered by the insulating layer 180 without exposure. In some embodiments, a height of an upper surface 123 of the first touch sensing layer 120 is greater than a height of an upper surface 143 of the metal wiring layer 140 (e.g., an upper surface 123 of the first touch sensing layer 120 is above the upper surface 143 of the metal wiring layer 140), and the insulating layer 180 can further extend along the outer sidewall 121 of the first touch sensing layer 120 to cover the outer sidewall 121 of the first touch sensing layer 120, which goes beyond the upper surface 143 of the metal wiring layer 140. In some embodiments, the outer sidewall 121 of the first touch sensing layer 120 is substantially aligned with an inner sidewall 185 of the insulating layer 180. In some embodiments, the height of the upper surface 123 of the first touch sensing layer 120 is greater than a height of an upper surface 183 of the insulating layer 180 (e.g., the upper surface 123 of the first touch sensing layer 120 is above the upper surface 183 of the insulating layer 180). However, the present disclosure is not limited in this regard. In some other embodiments, the upper surface 123 of the first touch sensing layer 120 may be substantially aligned with the upper surface 183 of the insulating layer 180. In some embodiments, the insulating layer 180 may further extend along an outer sidewall 145 of the metal wiring layer 140 to entirely cover the outer sidewall 145 of the metal wiring layer 140.

In some embodiments, the insulating layer 180 can be made of an insulating (non-conductive) resin or other organic materials. For example, the insulating layer 180 may include polyethylene, polypropylene, polyvinyl butyral, polycarbonate, acrylonitrile butadiene styrene, ceramic, polystyrene sulfonic acid, poly(3,4-ethylenedioxythiophene), or combinations of any of the foregoing ingredients. In some embodiments, the insulating layer 180 may also include, but is not limited to, any of the following polymers: polyacrylic resins (such as polymethacrylate, polyacrylate, and polyacrylonitrile); polyvinyl alcohol; polyesters (such as polycarbonate, polyethylene terephthalate, and polyethylene naphthalate); polymers with high aromaticity (such as phenolic resin or cresol-formaldehyde, polystyrene, polyimide, polyvinyl toluene, polyvinylxylene, polysulfone, polysulfide, polyamide, polyamideimide, polyetherimide, polyphenylene sulfide, and polyphenylene oxide); polyurethane; epoxy resin; polyolefins (such as polypropylene, polymethylpentene, and cycloolefin); polysiloxane and other silicon-containing polymers (such as polysilsesquioxane and polysilane); synthetic rubbers (such as ethylene-propylene-diene monomer, ethylene-propylene rubber, and styrene-butadiene rubber); fluoropolymers (such as polyvinylidene fluoride, polytetrafluoroethylene, and polyhexafluoropropylene); cellulose; polyvinyl chloride; polyvinyl acetate; polynorbornene; and copolymers of fluoro-olefins and hydrocarbon olefins. By the arrangement of the insulating resin or other organic materials, the first touch sensing layer 120 can be effectively electrically insulated from the metal wiring layer 140 through the insulating layer 180.

As mentioned above, the touch module 100 may further include a plurality of coating layers 160. The coating layers 160 can be disposed between the substrate 110 and the second touch sensing layer 130, between the second touch sensing layer 130 and the first touch sensing layer 120, and on the first touch sensing layer 120 to cover the first touch sensing layer 120 to achieve the effects of protection, insulation, or adhesion.

The material of the coating layer 160 may refer to the material of the insulating layer 180. In some embodiments, a material of the coating layer 160 may be substantially the same as a material of the insulating layer 180. In some embodiments, the coating layer 160 disposed between the substrate 110 and the second touch sensing layer 130 may be called a priming coating layer 160a, the coating layer 160 disposed between the second touch sensing layer 130 and the first touch sensing layer 120 may be called an intermediate coating layer 160b, and the coating layer 160 disposed on the first touch sensing layer 120 may be called a top coating layer 160c. In some embodiments, the priming coating layer 160a can further extend to an inner surface 173 of the light shielding layer 170 (i.e., a surface of the light shielding layer 170 facing away from the substrate 110) located in the peripheral area PR and extend to respective lower surfaces of the metal wiring layer 140, the transparent conductive layer 150, and the insulating layer 180 (i.e., surfaces of the metal wiring layer 140, the transparent conductive layer 150, and the insulating layer 180 facing the substrate 110). In other words, portions of the priming coating layer 160a are sandwiched between the metal wiring layer 140, the transparent conductive layer 150, the insulating layer 180, and the light shielding layer 170.

In some embodiments, the intermediate coating layer 160b is located in the visible area DR of the substrate 110, and the intermediate coating layer 160b and the insulating layer 180 can be further fabricated together in a same process. For example, the foregoing insulating resin or other organic materials can be formed on the priming coating layer 160a, the second touch sensing layer 130, the transparent conductive layer 150, and the metal wiring layer 140 by coating, and cured/dried, such that the insulating resin or other organic materials are formed above the substrate 110. Then, the insulating resin or other organic materials are patterned, such that the insulating resin or other organic materials can be defined as a pattern, thereby fabricating an intermediate coating layer 160b with a pattern in the visible area DR and fabricating an insulating layer 180 with a pattern in the peripheral area PR. The intermediate coating layer 160b is configured to protect at least the second touch sensing layer 130, and the insulating layer 180 is configured to protect at least the metal wiring layer 140. In other words, the intermediate coating layer 160b and the insulating layer 180 of the present disclosure can substantially belong to a same layer (i.e., can be portions of a single layer). In this way, the insulating layer 180 can be fabricated together with the intermediate coating layer 160b, in order to reduce manufacturing processes and costs.

In some embodiments, the top coating layer 160c can laterally extend and cover the entire first touch sensing layer 120. In some embodiments, the top coating layer 160c may be two or more layers (e.g., two layers), but the present disclosure is not limited in this regard. In some embodiments, an outer sidewall 161c of a bottommost top coating layer 160c can be substantially aligned with the outer sidewall 121 of the first touch sensing layer 120. In some embodiments, the bottommost top coating layer 160c can form a composite structure with the first touch sensing layer 120 to have certain specific chemical, mechanical, and optical properties. For example, the bottommost top coating layer 160c can provide good adhesion between the composite structure and other layers. As another example, the bottommost top coating layer 160c can provide good mechanical strength for the composite structure. In some embodiments, the bottommost top coating layer 160c may include a specific polymer, such that the composite structure has additional scratch-resistant and wear-resistant surface protection, thereby improving the surface strength of the composite structure. The foregoing specific polymer may be, for example, polyacrylate, polyurethane, epoxy resin, polysilane, polysiloxane, poly(silicon-acrylic acid), or combinations thereof. It should be noted that although the bottommost top coating layer 160c and the first touch sensing layer 120 are shown as different layers in accompanying drawings herein, in some embodiments, the material used to make the bottommost top coating layer 160c can penetrate, before being cured or in a pre-cured state, between metal nanowires of the first touch sensing layer 120 to form a filler, such that the metal nanowires can also be embedded into the bottommost top coating layer 160c after the bottommost top coating layer 160c is cured.

In some embodiments, a topmost top coating layer 160c located above the bottommost top coating layer 160c can further cover the outer sidewall 161c of the bottommost top coating layer 160c, the outer sidewall 121 of the first touch sensing layer 120, and the upper surface 183 of the insulating layer 180 and extend to the inner surface 173 of the light shielding layer 170 along an outer sidewall 181 of the insulating layer 180 and an outer sidewall 161a of the priming coating layer 160a, thereby protecting the touch module 100 from a side surface of the touch module 100. In some embodiments, a thickness H1 of the priming coating layer 160a may be between 20 nm and 10 μm, between 50 nm and 200 nm, or between 30 nm and 100 nm, in order to achieve good protection, insulation, or adhesion effects and avoid an excessively large thickness of the whole touch module 100. In detail, when the thickness H1 of the coating layer 160 is less than the foregoing lower limit, the coating layer 160 may fail to provide good protection, insulation, or adhesion functions. When the thickness H1 of the coating layer 160 is greater than the foregoing upper limit, the thickness of the whole touch module 100 may be excessively large, which is unfavorable for the process and seriously affects the appearance.

In other embodiments, the touch module 100 may further include a water vapor barrier layer 190 laterally extending on the topmost top coating layer 160c and covering the entire topmost top coating layer 160c. In addition, the water vapor barrier layer 190 further extends to the inner surface 173 of the light shielding layer 170 along the outer sidewall 161c of the topmost top coating layer 160c to cover the outer sidewall 161c of the topmost top coating layer 160c, thereby preventing water vapor in the environment from intruding from the water vapor intrusion surface and attacking an electrode (e.g., the first touch sensing layer 120). In this way, aggregation or precipitation of metal nanowires in the first touch sensing layer 120 can be avoided, and short circuit of the metal wiring layer 140 can be prevented, in order to improve the electrical sensitivity of the first touch sensing layer 120. In some embodiments, the water vapor barrier layer 190 may be, for example, conformally formed on an upper surface and the outer sidewall 161c of the topmost top coating layer 160c. In some embodiments, the water vapor barrier layer 190 may include, for example, an inorganic material such as a silicon-nitrogen compound ($SiN_x$), a silicon-oxygen compound, or combinations thereof. For example, the silicon-nitrogen compound may be silicon nitride ($Si_3N_4$), and the silicon-oxygen compound may be silicon dioxide ($SiO_2$). In other embodiments, the water vapor barrier layer 190 may be an inorganic material such as $MgO$—$Al_2O_3$—$SiO_2$, $Al_2O_3$—$SiO_2$, alumina, mullite, $MgO$—$Al_2O_3$-$SiO_2$-$Li_2O$, silicon carbide, carbon fiber, or combinations thereof. Compared with insulating resin or other organic materials, the inorganic material has lower hydrophilicity, such that the inorganic material can effectively prevent water vapor in the environment from intruding from the water vapor invasion surface and attacking an electrode. Moreover, in some embodiments, the light shielding layer 170 can further extend along an outer sidewall of the water vapor barrier layer 190 to cover the outer sidewall of the water vapor barrier layer 190.

In some embodiments, a thickness H2 of the water vapor barrier layer 190 may be between 30 nm and 110 nm in order to achieve good water blocking effects and avoid an excessively large thickness of the whole touch module 100. In detail, when the thickness H2 of the water vapor barrier layer 190 is less than 30 nm, the water vapor barrier layer 190 may not prevent water vapor in the environment from intruding from the water vapor invasion surface effectively. When the thickness H2 of the water vapor barrier layer 190 is greater than 110 nm, the thickness of the overall touch module 100 may be excessively large, which is unfavorable for the process and seriously affects the appearance. In addition, by selection of the inorganic material of the water vapor barrier layer 190 and selection of the thickness H2 of the water vapor barrier layer 190 according to the specific inorganic material selected, the water vapor barrier layer 190 can achieve better water blocking effects. For example, when the silicon-nitrogen compound is used alone as the inorganic material of the water vapor barrier layer 190, the thickness H2 of the water vapor barrier layer 190 may be set to about 30 nm. As another example, when the silicon-nitrogen compound and the silicon-oxygen compound are simultaneously used as inorganic materials of the water vapor barrier layer 190, the thickness H2 of the water vapor barrier layer 190 may be set between 40 nm and 110 nm, wherein the silicon-nitrogen compound and the silicon-oxygen compound can be stacked, and the thickness of the silicon-nitrogen compound layer may be between 10 nm and 30 nm, while the thickness of the silicon-oxygen compound layer may be between 30 nm and 80 nm.

Figure 2:
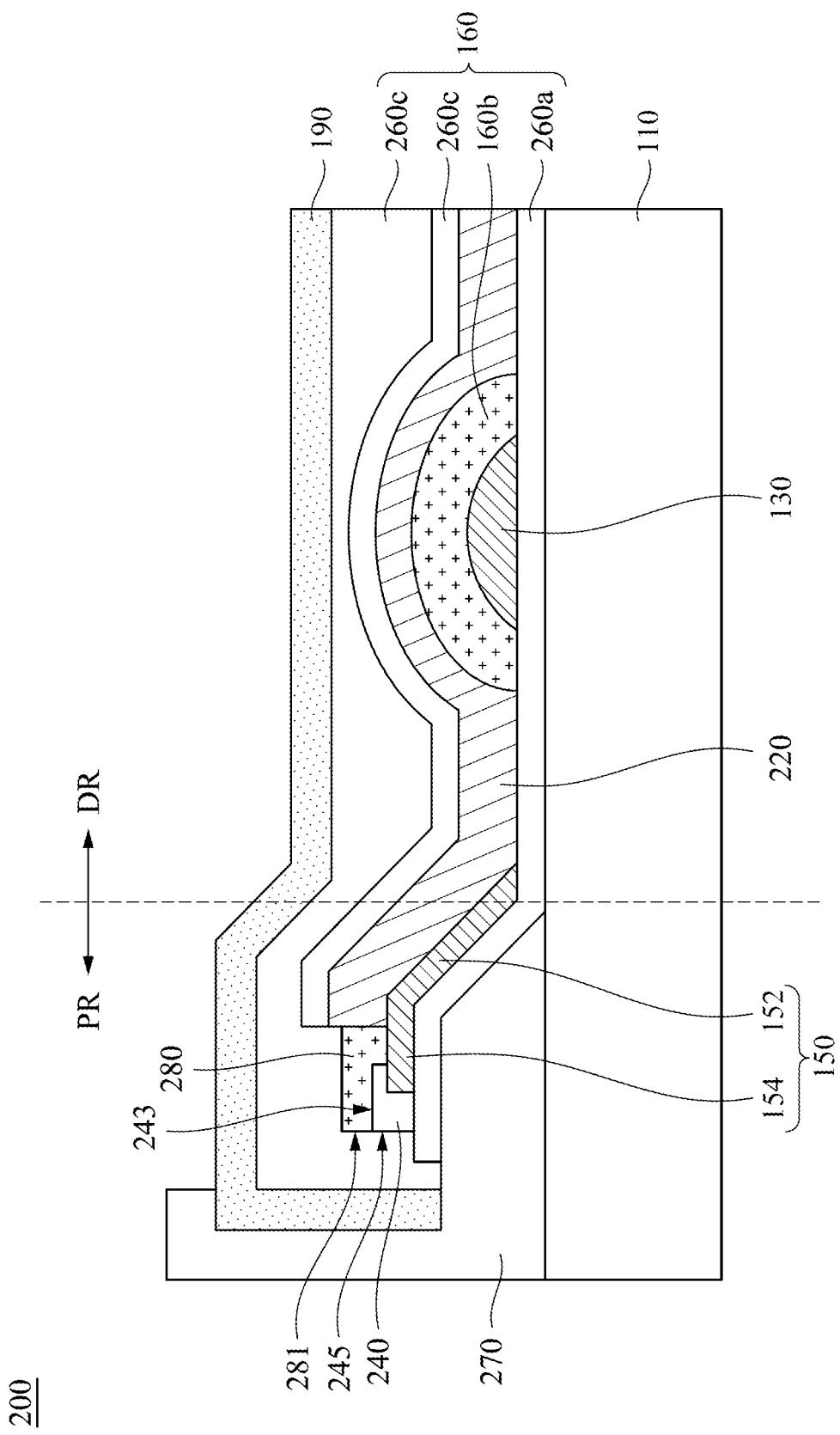
FIG. 2 is a schematic side view of a touch module according to some other embodiments of the present disclosure.

Referring to FIG. 2, a schematic side view of a touch module 200 according to some other embodiments of the present disclosure is illustrated. The touch module 200 of FIG. 2 differs from the touch module 100 of FIG. 1A at least in that an insulating layer 280 in the touch module 200 does not extend to a priming coating layer 260a along an outer sidewall 245 of a metal wiring layer 240 to entirely cover the outer sidewall 245 of the metal wiring layer 240, and an outer sidewall 281 of the insulating layer 280 is substantially aligned with the outer sidewall 245 of the metal wiring layer 240. In other words, the insulating layer 280 of the touch module 200 only covers an upper surface 243 of the metal wiring layer 240 and extends between a first touch sensing layer 220 and the metal wiring layer 240. Further, a topmost top coating layer 260c of the touch module 200 further extends to the priming coating layer 260a and a light shielding layer 270 along the outer sidewall 245 of the metal wiring layer 240 to entirely contact and cover the outer sidewall 245 of the metal wiring layer 240. Since the touch module 200 of FIG. 2 omits the insulating layer 280 on a side edge compared with the touch module 100 of FIG. 1A, the touch module 200 of FIG. 2 can have a smaller width, thus preferably meeting the requirement for a narrow bezel of products.

Figure 3:
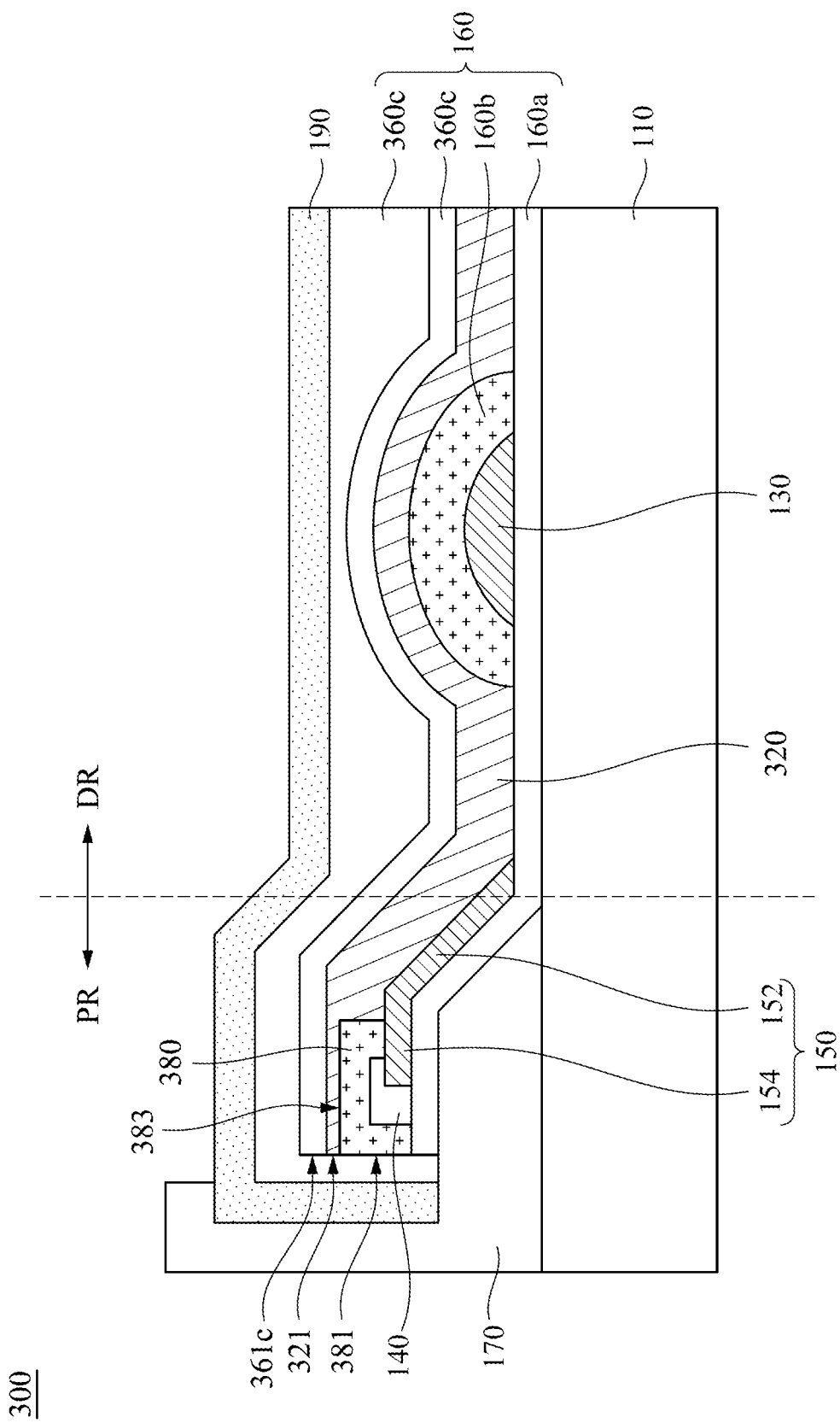
FIG. 3 is a schematic side view of a touch module according to some other embodiments of the present disclosure.

Referring to FIG. 3, a schematic side view of a touch module 300 according to some other embodiments of the present disclosure is illustrated. The touch module 300 of FIG. 3 differs from the touch module 100 of FIG. 1A at least in that a first touch sensing layer 320 in the touch module 300 further extends along an upper surface 383 of an insulating layer 380 to cover the upper surface 383 of the insulating layer 380. In some embodiments, an outer sidewall 321 of the first touch sensing layer 320 can further be substantially aligned with an outer sidewall 381 of the insulating layer 380. That is, the first touch sensing layer 320 entirely covers the upper surface 383 of the insulating layer 380. Further, a bottommost top coating layer 360c can also extend with the first touch sensing layer 320 to cover the upper surface 383 of the insulating layer 380, and an outer sidewall 361c of the bottommost top coating layer 360c can be substantially aligned with the outer sidewall 321 of the first touch sensing layer 320 and the outer sidewall 381 of the insulating layer 380. However, in other embodiments, the first touch sensing layer 320 and the bottommost top coating layer 360c may only cover a portion of the upper surface 383 of the insulating layer 380. That is, a portion of the upper surface 383 of the insulating layer 380 is in direct contact with the first touch sensing layer 320, while another portion of the upper surface 383 of the insulating layer 380 is in direct contact with the topmost top coating layer 360c.

Figure 4:
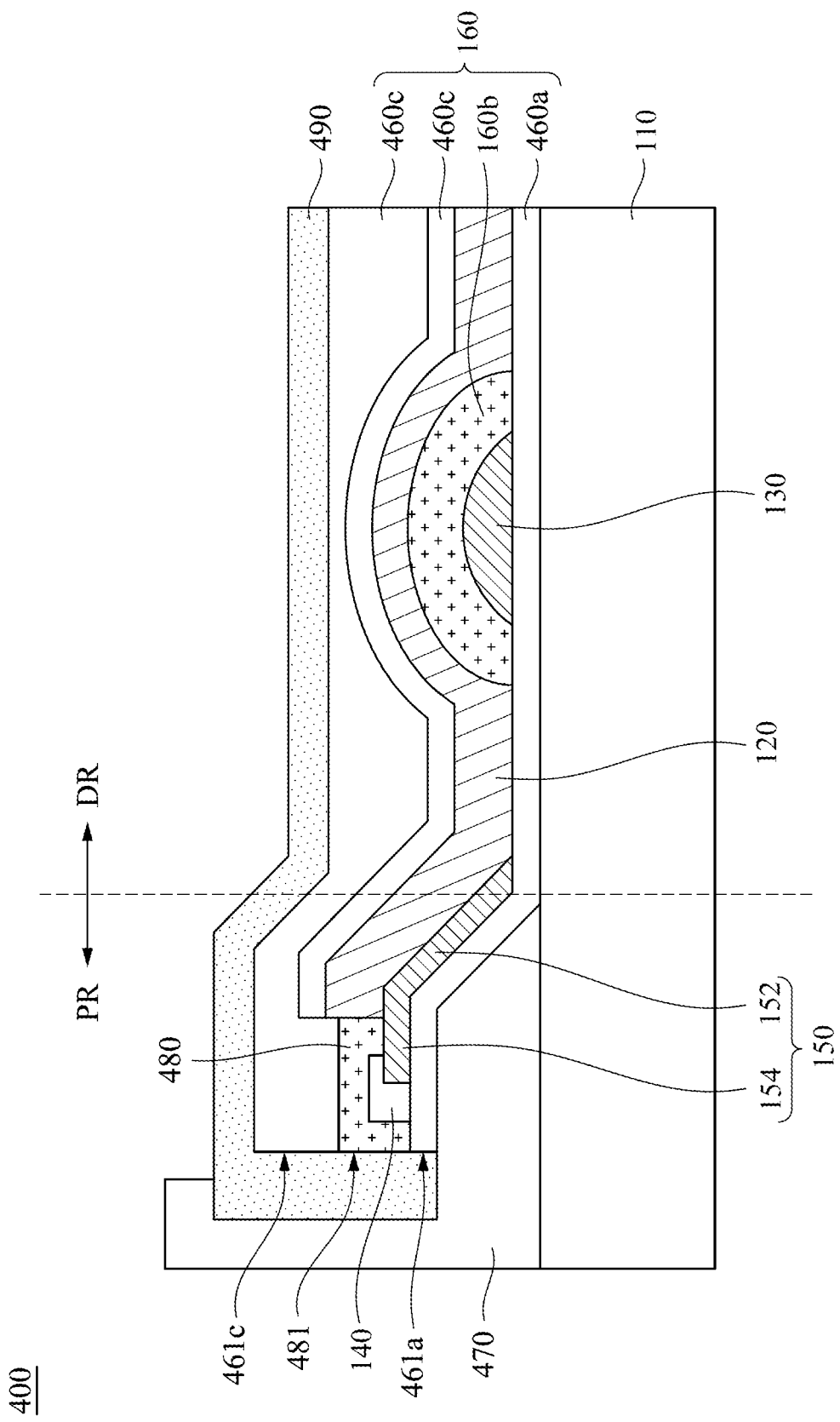
FIG. 4 is a schematic side view of a touch module according to some other embodiments of the present disclosure.

Referring to FIG. 4, a schematic side view of a touch module 400 according to some other embodiments of the present disclosure is illustrated. The touch module 400 of FIG. 4 differs from the touch module 100 of FIG. 1A at least in that a topmost top coating layer 460c of the touch module 400 does not extend to a light shielding layer 470 along an outer sidewall 481 of an insulating layer 480 and an outer sidewall 461a of a priming coating layer 460a, and an outer sidewall 461c of the topmost top coating layer 460c is substantially aligned with the outer sidewall 481 of the insulating layer 480. Further, a water vapor barrier layer 490 of the touch module 400 further extends to the light shielding layer 470 along the outer sidewall 461c of the topmost top coating layer 460c, the outer sidewall 481 of the insulating layer 480, and the outer sidewall 461a of the priming coating layer 460a to entirely contact and cover the outer sidewall 461c of the topmost top coating layer 460c, the outer sidewall 481 of the insulating layer 480 and the outer sidewall 461a of a priming coating layer 460a. Since the touch module 400 of FIG. 4 omits the bottommost top coating layer 460c on a side edge compared with the touch module 100 of FIG. 1A, the touch module 400 of FIG. 4 can have a smaller width, thus preferably meeting the requirement for a narrow bezel of products.

Figure 5:
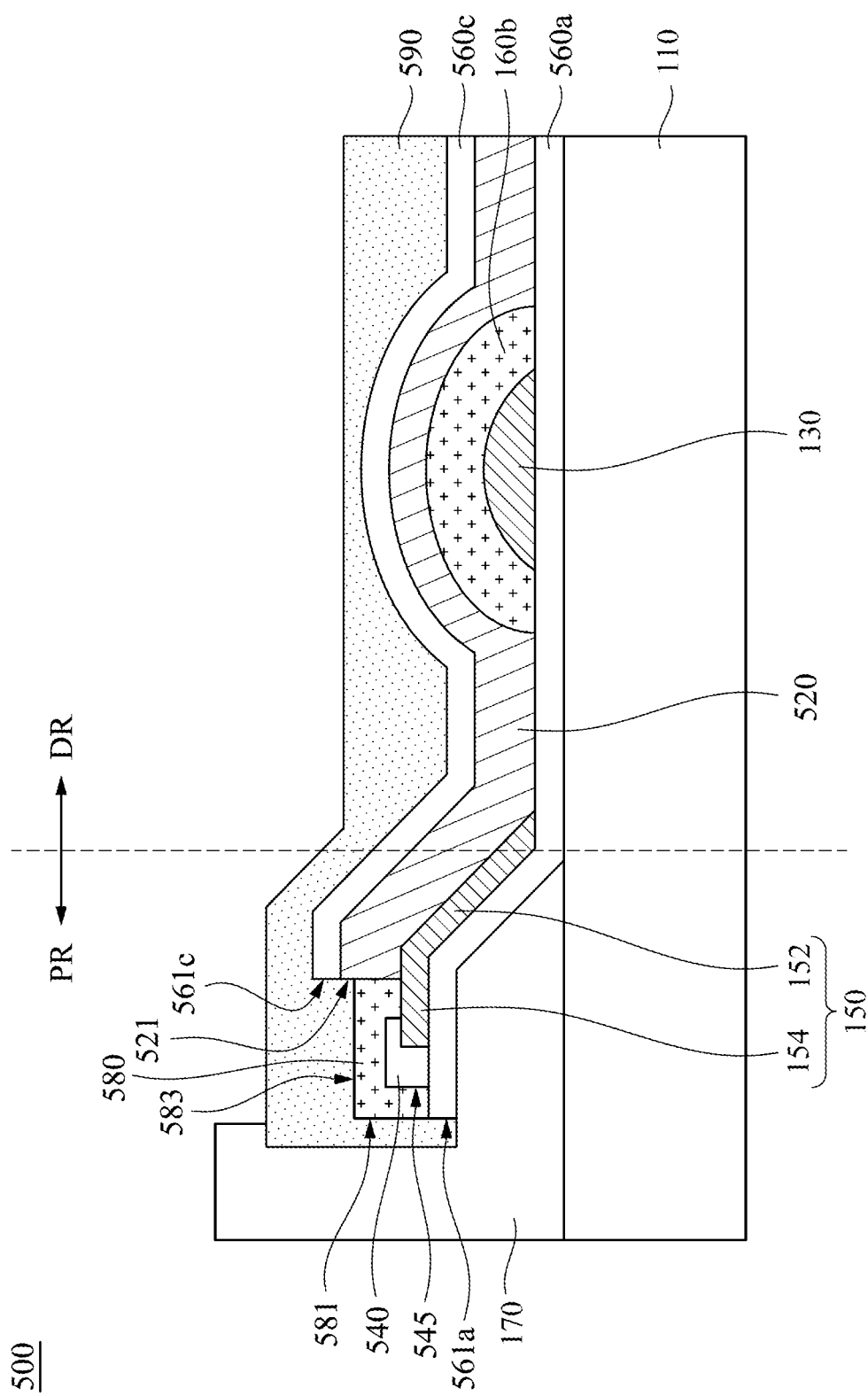
FIG. 5 is a schematic side view of a touch module according to some other embodiments of the present disclosure.

Referring to FIG. 5, a schematic side view of a touch module 500 according to some other embodiments of the present disclosure is illustrated. The touch module 500 of FIG. 5 differs from the touch module 100 of FIG. 1A at least in that a water vapor barrier layer 590 in the touch module 500 replaces the topmost top coating layer 160c shown in FIG. 1A. In other words, the touch module 500 in FIG. 5 has only one top coating layer 560c. The top coating layer 560c is the topmost top coating layer of the touch module 500, and the water vapor barrier layer 590 directly covers the surface of the top coating layer 560c. In addition, the water vapor barrier layer 590 further extends along an outer sidewall 561c of the top coating layer 560c, an outer sidewall 521 of the first touch sensing layer 520, an upper surface 583 and an outer sidewall 581 of an insulating layer 580, and an outer sidewall 561a of a priming coating layer 560a to entirely contact and cover the outer sidewall 561c of the top coating layer 560c, the outer sidewall 521 of the first touch sensing layer 520, the upper surface 583 and the outer sidewall 581 of the insulating layer 580, and the outer sidewall 561a of the priming coating layer 560a. In some embodiments, when the insulating layer 580 does not cover an outer sidewall 545 of a metal wiring layer 540, the water vapor barrier layer 590 can further contact and cover the outer sidewall 545 of the metal wiring layer 540. Since the touch module 500 of FIG. 5 omits the top coating layer 560c compared with the touch module 100 of FIG. 1A, the touch module 500 of FIG. 5 can have a smaller thickness compared with the touch module 100 of FIG. 1A, thereby meeting the requirement of thinning of products. Further, the touch module 500 of FIG. 5 can further have a smaller width, thus preferably meeting the requirement for a narrow bezel of products.

According to the aforementioned embodiments of the present disclosure, the present disclosure provides a display module with a transparent conductive layer located in a peripheral area. The transparent conductive layer can be electrically connected to a touch sensing layer located in a visible area and a metal wiring layer located in the peripheral area in order to implement the electrical bonding between the touch sensing layer and the metal wiring layer. By the arrangement of the transparent conductive layer, direct use the touch sensing layer including metal nanowires for bonding can be avoided. By the selection of the material of the transparent conductive layer, the spontaneous electrochemical reaction between metal nanowires in the touch sensing layer and metal wiring can also be avoided. In this way, the effect of reducing lap-joint impedance can be achieved well to improve reliability of products and meet the requirement for a narrow bezel of the touch module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch module, comprising:
   a substrate having a visible area and a peripheral area located around the visible area;
   a first touch sensing layer extending from the visible area to the peripheral area of the substrate;
   a metal wiring layer located in the peripheral area of the substrate and laterally separated from the first touch sensing layer; and
   a transparent conductive layer located in the peripheral area of the substrate, wherein the transparent conductive layer has a first portion and a second portion, the first portion is in contact with the first touch sensing layer and the second portion is in contact with the metal wiring layer.

2. The touch module of claim 1, wherein the first portion of the transparent conductive layer is located between the substrate and the first touch sensing layer, and the second portion of the transparent conductive layer is located between the substrate and the metal wiring layer.

3. The touch module of claim 1, wherein the transparent conductive layer further extends to the visible area of the substrate.

4. The touch module of claim 1, wherein the metal wiring layer and the first touch sensing layer are separated by a lateral distance, and the lateral distance is between 5 μm and 15 μm.

5. The touch module of claim 1, further comprising at least one insulating layer covering an upper surface of the metal wiring layer and extending between the first touch sensing layer and the metal wiring layer.

6. The touch module of claim 5, wherein a width of the insulating layer is between 10 μm and 20 μm.

7. The touch module of claim 5, wherein the insulating layer further extends to cover an outer sidewall of the metal wiring layer.

8. The touch module of claim 5, wherein the transparent conductive layer further has a third portion located between the first portion and the second portion, and the third portion is in contact with the insulating layer.

9. The touch module of claim 5, wherein an outer sidewall of the first touch sensing layer is aligned with an inner sidewall of the insulating layer.

10. The touch module of claim 5, wherein the first touch sensing layer further extends to cover an upper surface of the insulating layer.

11. The touch module of claim 10, wherein an outer sidewall of the first touch sensing layer is aligned with an outer sidewall of the insulating layer.

12. The touch module of claim 1, further comprising a second touch sensing layer located in the visible area of the substrate and between the substrate and the first touch sensing layer, wherein a material of the second touch sensing layer is identical to a material of the transparent conductive layer.

13. The touch module of claim 1, wherein a material of the transparent conductive layer comprises indium tin oxide, indium zinc oxide, cadmium tin oxide, aluminum-doped zinc oxide, or combinations thereof.

14. The touch module of claim 1, wherein the first touch sensing layer comprises a matrix and a plurality of metal nanostructures distributed in the matrix.

15. The touch module of claim 1, further comprising a light shielding layer located between the substrate and the transparent conductive layer.

16. The touch module of claim 1, further comprising a water vapor barrier layer laterally extending on the first touch sensing layer, the metal wiring layer, and the transparent conductive layer, wherein the water vapor barrier layer comprises an inorganic material.

17. The touch module of claim 16, wherein the inorganic material comprises a silicon-nitrogen compound, a silicon-oxygen compound, or combinations thereof.

18. The touch module of claim 16, wherein the water vapor barrier layer extends to cover an outer sidewall of the first touch sensing layer and an outer sidewall of the metal wiring layer.

19. The touch module of claim 16, further comprising at least one coating layer located between the water vapor barrier layer and the first touch sensing layer.

20. The touch module of claim 19, wherein the water vapor barrier layer further extends to cover an outer sidewall of the coating layer.

* * * * *